June 5, 1956
R. H. DICKE ET AL
2,749,443
MOLECULAR RESONANCE SYSTEM
Filed Aug. 22, 1951
6 Sheets-Sheet 3
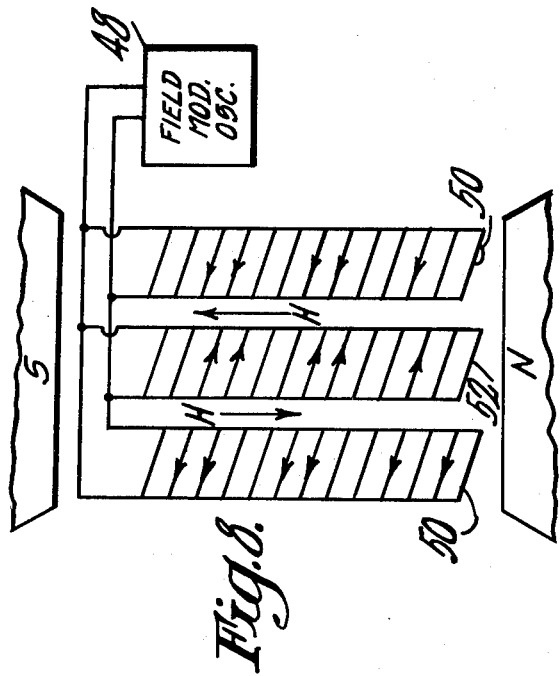
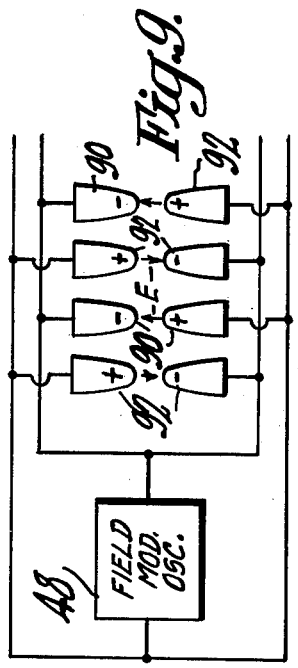
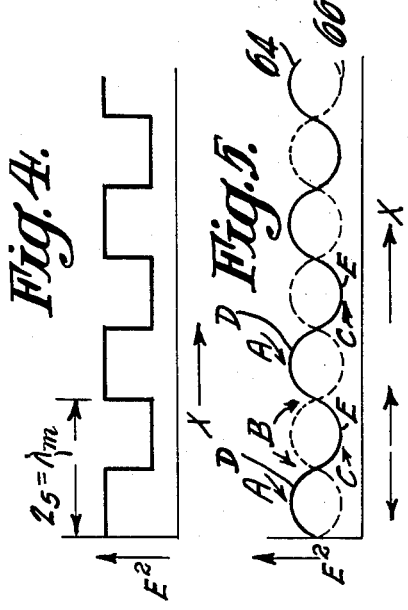
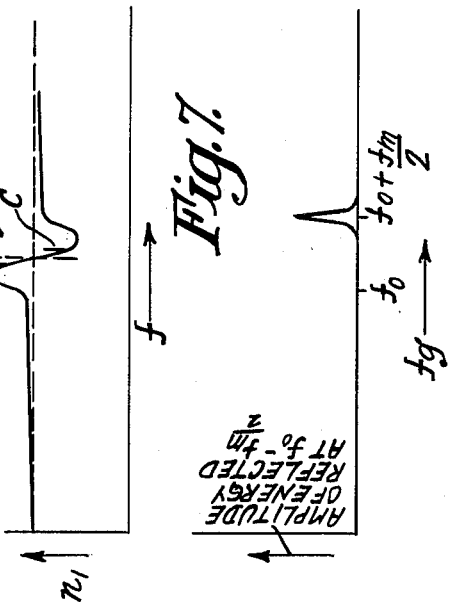
INVENTORS
ROBERT H. DICKE
& GEORGE H. NEWELL, JR.
BY
ATTORNEY June 5, 1956  R. H. DICKE ET AL  2,749,443
MOLECULAR RESONANCE SYSTEM
Filed Aug. 22, 1951  6 Sheets-Sheet 4
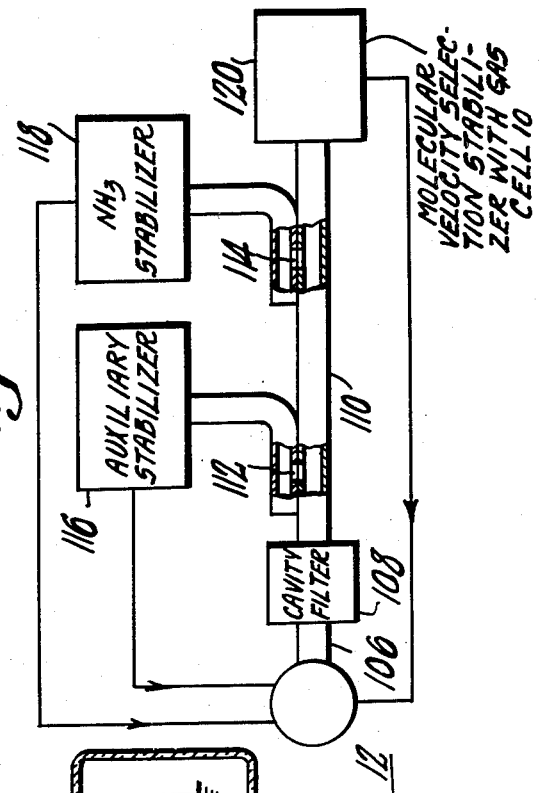
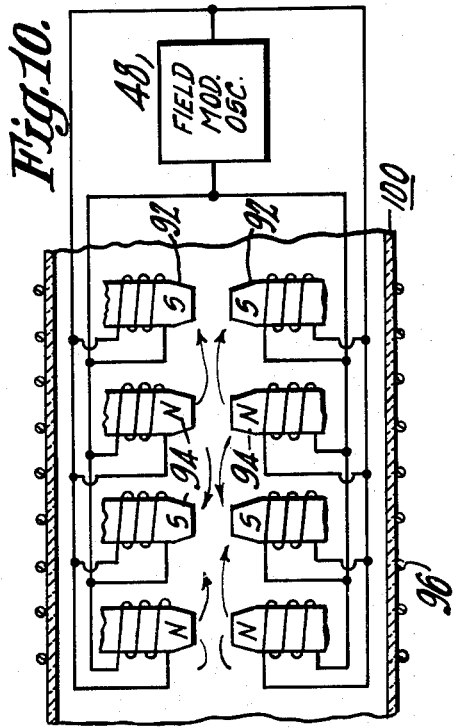
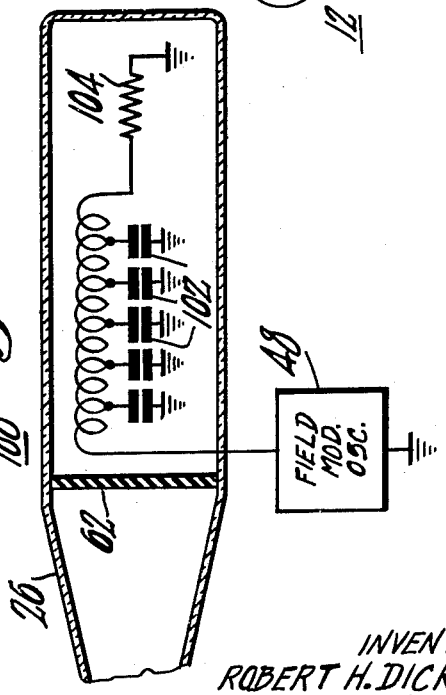
INVENTORS
ROBERT H. DICKE
& GEORGE S. NEWELL, JR.
BY
ATTORNEY

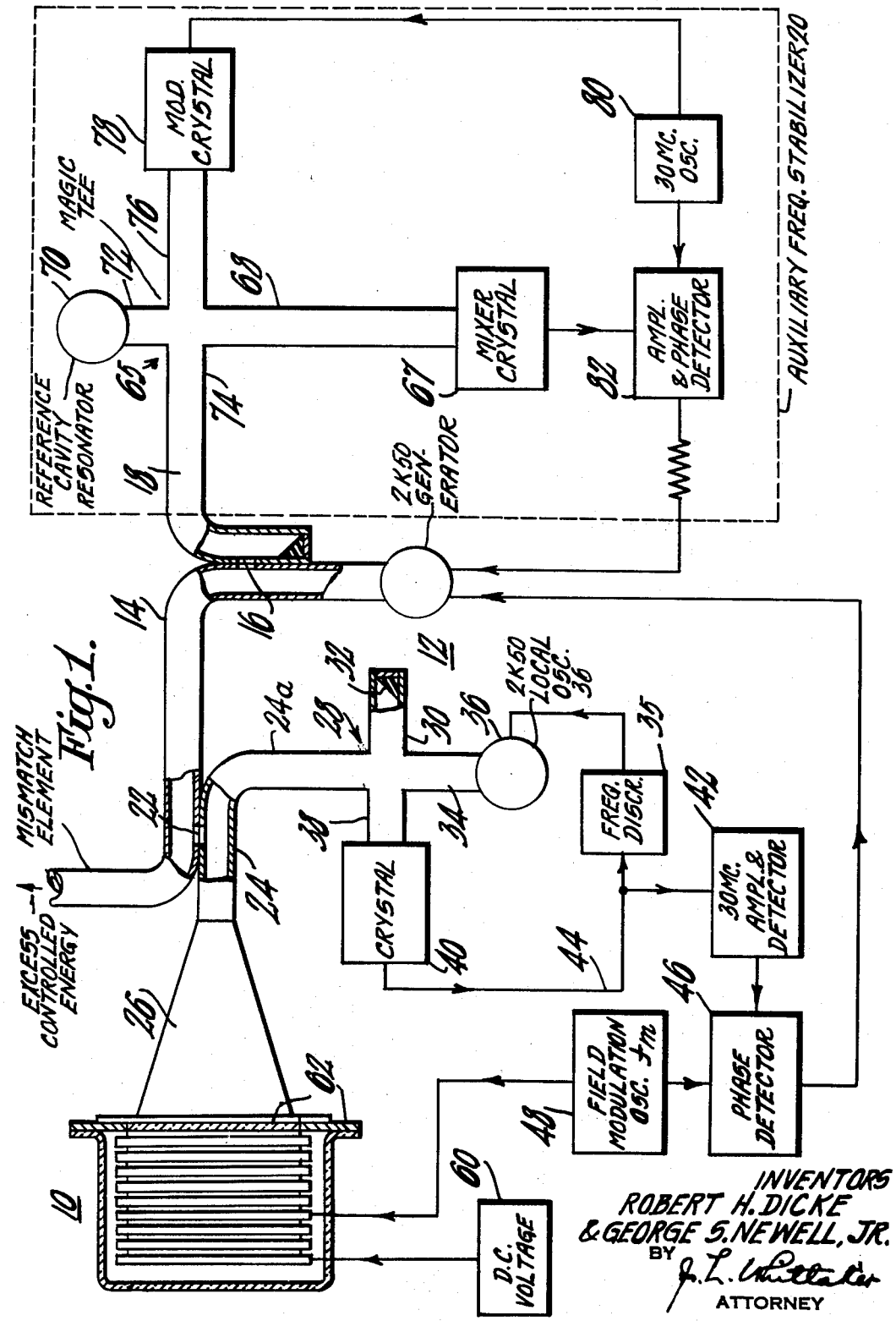

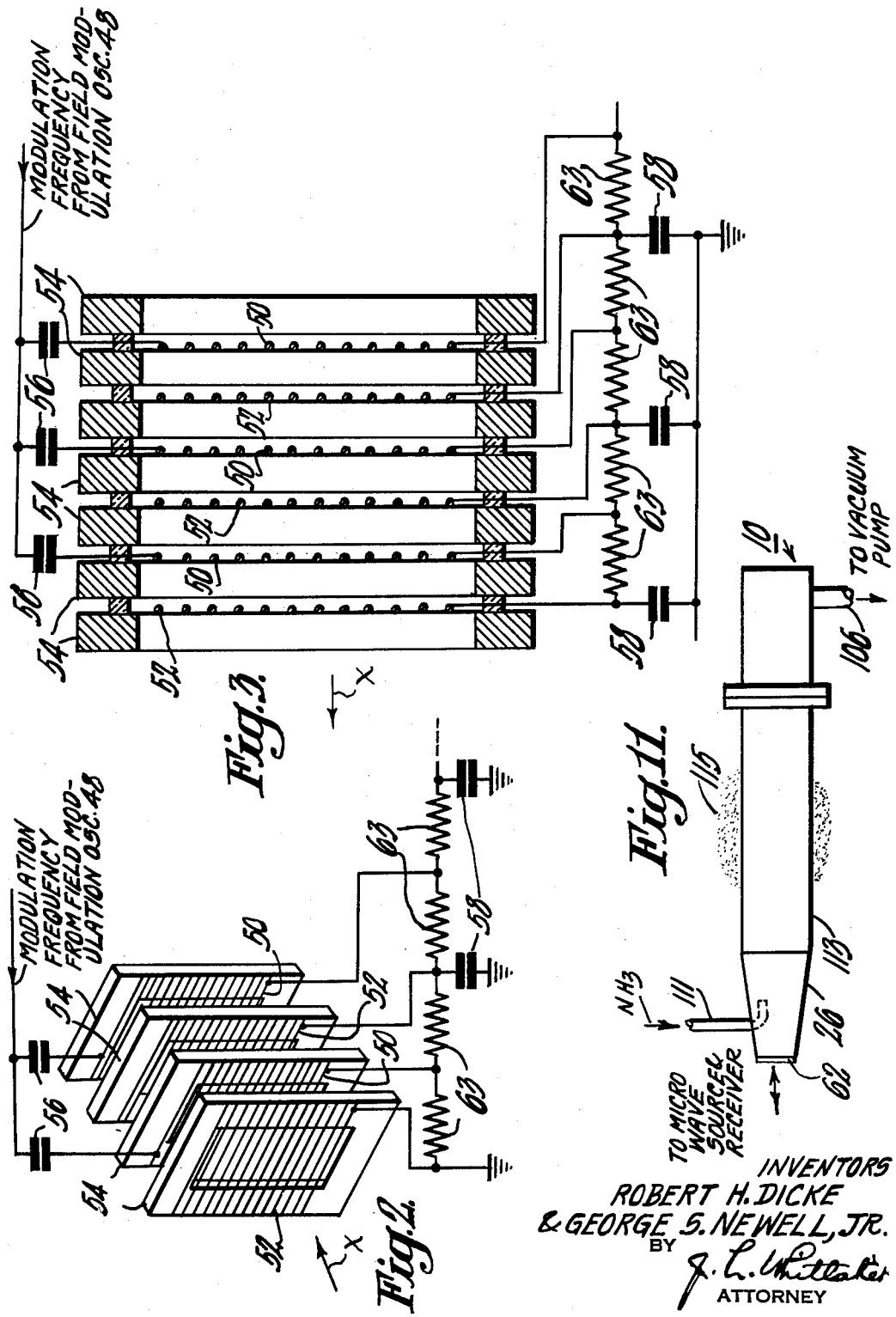

INVENTORS
ROBERT H. DICKE
& GEORGE S. NEWELL, JR.
BY
ATTORNEY

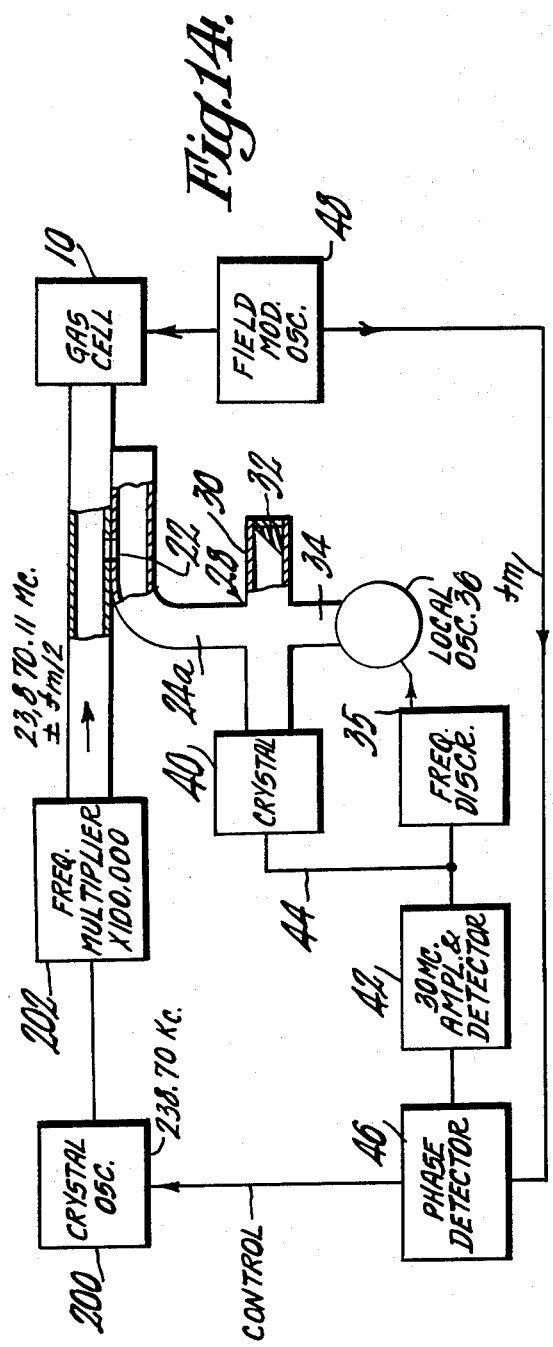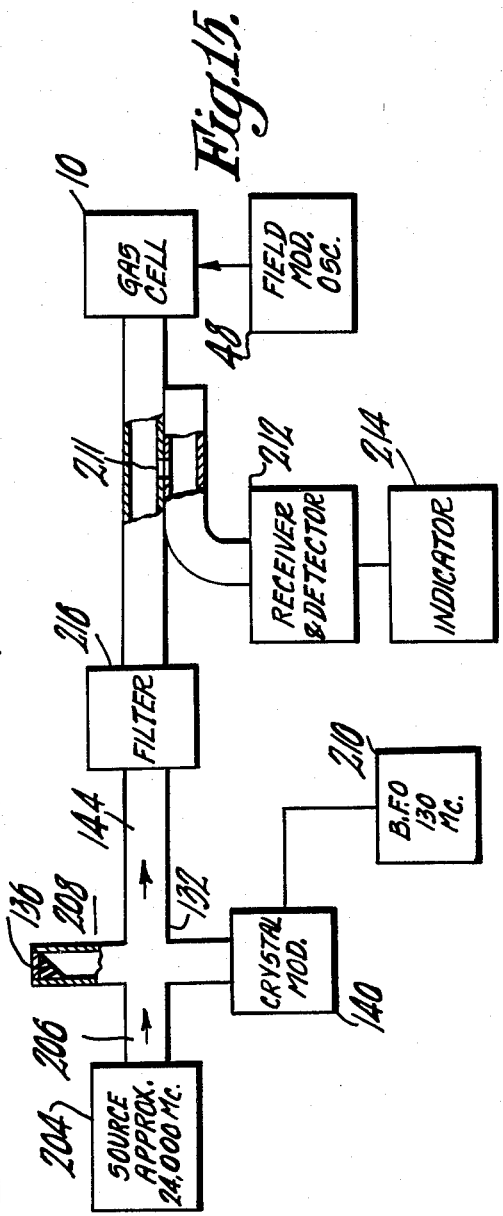

United States Patent Office 2,749,443
Patented June 5, 1956

2,749,443

MOLECULAR RESONANCE SYSTEM

Robert H. Dicke and George S. Newell, Jr., Princeton, N. J.

Application August 22, 1951, Serial No. 243,082

21 Claims. (Cl. 250—36)

The present invention is related to the employment of molecular resonance as a frequency standard, and more particularly to novel apparatus and methods for controlling frequencies in response to molecular resonance, or for use in microwave spectroscopy.

It is known to control the frequency of a generator by utilizing the molecular resonances of selectively microwave absorptive gas as a frequency standard. Molecular resonances, as standards, have the merits of high stability, and of being absolute in nature. In the usual system of the type heretofore known, a gas cell is employed filled at low pressure with a selected gas having a particular known molecular resonance. Microwave electromagnetic energy is applied to the cell, and the gas absorbs energy at the frequency of a selected one of its resonant absorption lines. Either the amplitude variations resulting from the absorption, or the phase shift resulting from the absorption may be employed for frequency control purposes. Typical systems and methods of stabilizing microwave frequencies are disclosed and claimed in the copending applications of William D. Hershberger, Serial No. 786,736, filed November 18, 1947, now Patent No. 2,702,350; and Serial No. 4,497, filed January 27, 1948, now Patent No. 2,702,351; and of Lowell E. Norton, Serial No. 5,603, filed January 31, 1948, now Patent No. 2,559,730.

There are four known factors which influence the frequency width of a molecular resonance absorption line or frequency spectrum. These factors described in a qualitative way are, (1) the natural width of the line; (2) saturation broadening as the result of high microwave power applied to the gas; (3) collision broadening, as the result of interruption of the natural oscillation of a molecule because of a collision with another molecule of gas or with other obstacles, and (4) Doppler broadening, the result of the random motion of molecules in resonant oscillation toward and away from the source of the energy. Reduction of the pressure, thereby increasing the mean free path of the molecules, avoids the effects of collision broadening. Also, at sufficiently low power levels, saturation broadening is avoided, and at microwave frequency the natural width is substantially negligible. However, the Doppler broadening of the line remains. This residual Doppler width heretofore limited the effective "Q" of the arrangement as used for frequency stabilization, and thus limited the degree of stabilization obtainable.

Among the objects of the present invention are to avoid the difficulties of the prior art.

Another object is to employ molecular resonances as a frequency standard or control in a manner affording a more stable standard and control than heretofore available.

A further object is to provide a novel gas cell and a novel mode of operation thereof for employment of the molecular resonance phenomena for frequency stabilization and control or for spectroscopy.

Still another object is to employ molecular resonance phenomena in a novel method and novel apparatus so that the effective circuit "Q" is appreciably higher than heretofore;

A further object is to provide a novel gas cell and apparatus and methods for its employment as a frequency standard or control in which the effects of collision broadening of the resonant lines and of Doppler broadening of the resonant lines are effectively and substantially diminished.

Another object of the invention is to improve the resolution obtainable in microwave spectroscopy.

In accordance with the invention, the reflection of microwave energy from a gas in the cell, rather than energy absorption is employed. Further, an electric or magnetic field (denominated in accordance with which field stores the larger part of the energy) is set up in the gas cell. This field is periodic in space and preferably periodic in time (alternating) as well. The alternating field provides a frequency shift (due to the Stark or Zeeman effects depending on whether the field is electric or magnetic) whereby the resonance lines are split, or with weaker fields shifted, in accordance with known phenomena.

Because of the spatially periodic field, and the Stark or Zeeman effects caused thereby, when the periodicity in space is properly selected in relation to the microwave wavelength of incident energy, only a class of molecules moving at a selected velocity tend to contribute constructive reflections, as explained more fully hereinafter. Molecules moving at other than the selected velocities tend to contribute destructive reflections. Because those molecules contributing the constructive reflections are all in a single narrow class of velocities, Doppler spread due to contributions from widely different velocity classes of molecules is avoided. Consequently the reflection line (or spectrum of the reflected energy) is at a frequency shifted from the incident energy frequency, and the width of the reflected line at the shifted frequency is that due substantially solely to the collisions with the internal wall surfaces and other internal gas cell structure, and very little due to Doppler broadening. Gas collision broadening is reduced by using a suitably low gas pressure.

Furthermore, since the frequency of the constructively reflected energy is, in general, displaced conveniently from that of the incident energy, detection of the reflection line is not difficult. The width of the reflection line observed and used under favorable conditions has negligible Doppler width because of the inherent molecular velocity selectivity of the system. This molecular velocity selectivity is therefore an important feature of the present invention.

In a preferred embodiment of the invention, the gas cell has regularly spaced parallel planar grids. All of the grids are at progressively increasing potentials. Alternate grids are at a fixed potential and the other alternate grids have a time alternating electric potential applied thereto. A field periodic in both time and space is provided by this means. Microwave energy at a frequency close to resonance of the gas is applied to this cell, and energy reflected therefrom is detected at a predetermined frequency removed from the frequency of the incident energy.

The reflection line width is substantially unaffected by Doppler or collision broadening, provided the gas cell pressure is sufficiently low.

The optimum pressure for operation of this cell is that at which gas collisions cause a line broadening slightly less than the broadening due to the collisions with walls and grids or other structure internal to the cell envelope. Below this pressure, line width is not appreciably decreased by decreased pressure; only the line intensity is decreased. A pressure of this order of magnitude is termed herein a low pressure. The optimum pressure may depend on the dimensions of the cell. In the cell described herein, with ammonia gas, a low pressure was one of the order of $10^{-4}$ mm. of Hg. Since different gases have different average velocities and collision cross-sections, higher pressures may be tolerated with some gases than with others. In each case, the optimum pressure at least to a reasonable degree sufficient for practical purposes, may be determined by test, and by noting at what pressure the reflection line does not become substantially narrower with decreasing pressure.

The reflected energy at the receiver is readily separated from the incident energy in a useful manner, and has the characteristics of an extremely narrow width frequency spectra line with anomalous dispersion at the resonance point. This characteristic may be employed to advantage. Other forms of the gas cell are also described herein and various systems and methods for the operation and employment of these cells.

The foregoing and other objects, advantages, and novel features of the invention will be more apparent from the following description in which like reference numerals refer to like parts and in which:

Fig. 1 is a diagram schematically representing a system for frequency control in accordance with the invention;

Fig. 2 is a diagrammatic exploded representation in perspective of the grids of the gas cell employed in the system of Fig. 1, showing more clearly the connections made thereto;

Fig. 3 is a diagrammatic cross-sectional view of a portion of the grids of the gas cell of Fig. 1 and also shows some of the electrical connections thereto;

Figure 12:
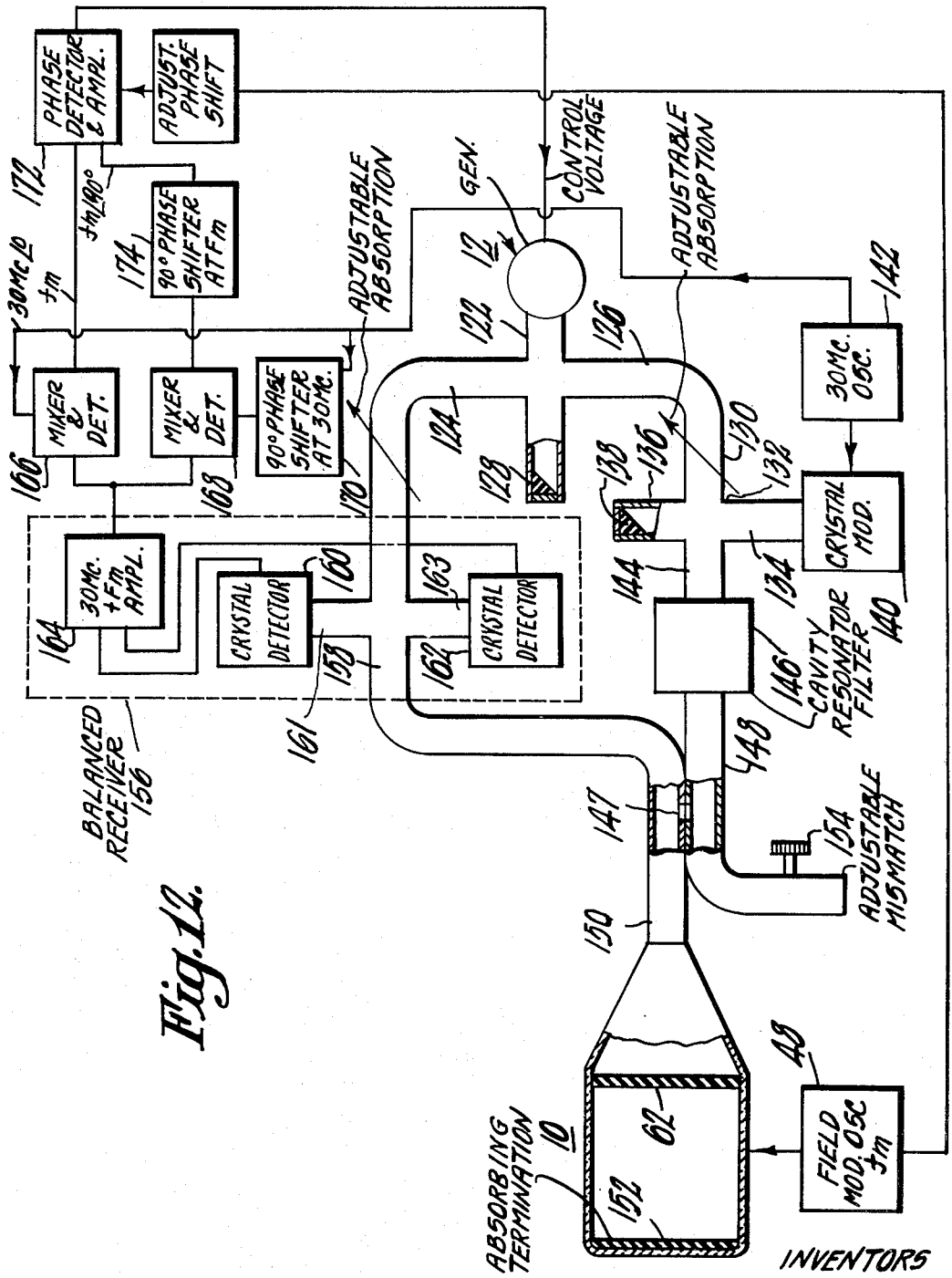

Figs. 4, 5, 6, and 7 are graphs useful in explaining the principles of operation of the gas cell and system of Fig. 1;

Fig. 8 is a schematic line drawing illustrating a different manner of connection and mode of operation of the gas cell of Fig. 2;

Fig. 9 is a schematic cross-sectional view (omitting the envelope) and the electrical connections for still another gas cell according to the invention;

Fig. 10 is a schematic cross-sectional view (omitting the envelope) and the electrical connections for a further gas cell according to the invention;

Fig. 10a is a schematic face view of yet another gas cell according to the invention;

Fig. 11 is a schematic face view of an arrangement for creating a molecular beam to use in the gas cell of Fig. 2;

Figs. 12, 13, and 14 are schematic diagrams of different frequency stabilization arrangements according to the invention; and Fig. 15 is a schematic diagram of a frequency measuring arrangement according to the invention.

*System description—Fig. 1*

Referring to Fig. 1, a gas cell 10 has within it at low pressure a gas such as ammonia, $NH_3$, exhibiting molecular resonance at a microwave frequency. The gas cell 10 will be described more fully hereinafter. Microwave energy at or near a particular predetermined frequency $f_0$ is generated in a microwave generator 12 exemplified by a type 2K50 klystron. Energy from the klystron 12 passes through a waveguide 14, a portion being withdrawn at a directional coupler 16 through a second waveguide 18. The second waveguide 18 applies energy to an auxiliary frequency stabilizer 20 for reasons which will appear more fully hereinafter.

A portion of the energy in waveguide 14 is coupled out at a second directional coupler 22 into a waveguide 24 by which the energy is applied through a horn 26 to the gas cell 10. The directional couplers 16 and 22 may each be a long slot in a wall portion common to the coupled waveguides. The length of slot determines the amount of coupled energy, as known.

Energy reflected by the gas cell 10 passes back through the horn 26 and waveguide 24 toward a magic Tee 28. Portion 24a of waveguide 24 may be considered as one arm of magic Tee 28. The other three arms of Magic Tee 28 are arm 30, terminated by an absorber arrangement 32; arm 34 terminated by a local oscillator 36; and arm 38 terminated by a detector crystal 40. The beat frequency signal detected by the crystal 40 is applied to an amplifier and detector 42 by a connection 44. The connection 44 is here shown diagrammatically as a single line, as are some other connections in the drawing, but may in fact be any connection suitable to the frequencies involved, as for example, in this instance, a coaxial line.

The amplifier and detector 42 detects a difference signal between the gas cell reflection energy and the energy incident on the gas cell, as beat down by action of the crystal 40 by the local oscillator signal. This difference signal is of the character of a modulation signal with a frequency of the difference between the incident and reflected energy, as will appear more fully hereinafter. The difference frequency signal or modulation frequency is detected in a detector 46 supplied by a reference signal of a frequency $f_m$ from an oscillator 48, termed the field modulation oscillator. This terminology is selected because the field modulation oscillator 48 supplies a signal of this same difference frequency to some of the grids of gas cell 10, to cause a kind of field modulation or variation, which is more fully explained hereinafter.

*Gas cell description—Figs. 2 and 3*

Referring to Figs. 2 and 3, the gas cell 10 includes a series of parallel, equally spaced grids, alternate ones of which are designated 50 and the other alternate ones as grids 52. These may be spaced and conveniently mounted on rectangular dielectric or insulated metallic frames 54 which also serve as spacers. Alternate grids 50 are connected through blocking capacitors 56 to receive a signal from the field modulation oscillator 48. The other alternate grids 52 are connected through blocking capacitors 58 to a common ground connection, conventionally shown. A source of D. C. (direct current) voltage 60 (shown as a block in Fig. 1) is connected to the ends of a chain of serially connected resistors 63 (Fig. 3) which serve as a voltage divider. Each grid 50, 52 is connected at a junction between the resistors 62, so that each grid 50, 52 is at a higher potential than the preceding, and a lower potential than a succeeding grid. The direction of increasing voltage is immaterial to the cell operation. The grids are located in geometrical surfaces (in this case planes) substantially normal to the direction of propagation of energy incident from the horn 26 of Fig. 1. The grid wires are perpendicular to the direction of polarization of the microwave energy, in order that the latter may propagate without interference. In the view of Fig. 2, to be specific, the energy from horn 26 of Fig. 1 may be considered as incident from the left toward the right in order to make simpler the subsequent explanation. The incident energy from horn 26 may therefore be considered as traveling in the direction of the arrow X in Fig. 3.

*Gas cell operation*

An understanding of the operation of the system requires first an understanding of the operation of the gas cell 10. For this purpose, consider the kind of field which exists in the gas cell 10 when field modulation of frequency $f_m$ is applied to the alternate grids 50. This field from the first to the last grid in the X direction is an alternating field superimposed on a field of strength fixed by the D. C. voltage. A somewhat idealized plot of an instantaneous square of the resulting field strength (not the applied voltage or potential) is plotted in Fig. 4, as $E^2$, against distance in the X direction. This square wave is, of course, oscillating at a frequency $f_m$ with time, only the peak $E^2$ values being plotted.

The fundamental component of the wave of Fig. 4 may be considered as a standing wave comprising two travelling waves. These two travelling waves are schematically illustrated, the one drawn as a solid wave 64 and the other as a dotted wave 66 in Fig. 5, being respectively a forward wave moving in the X direction, and a backward wave moving in the —X direction.

The ammonia gas in this cell exhibits a Stark effect; the resonant frequency shift for this gas at the resonance line employed is roughly quadratic, that is, proportional to the square of the field in which the gas finds itself. Therefore, the applied D. C. voltage may be employed to enhance the variation of the shift with the superimposed alternating field, which alternating field therefore may be weaker to give the same shifts than if the fixed field were absent. If the shift of the gas employed in the cell were linear with applied field, as is true of some gases, then the fixed field would serve no function, and in such cases may be omitted. But if the shift is proportional to the absolute value of some function of the applied field, some D. C. component (analogous to bias) may have to be employed.

The field periodic in both space and time then gives two travelling waves. Consider first the wave 64 which has a velocity $v_m = f_m \cdot \lambda_m$ in the X direction, where $\lambda_m = 2s$, twice the grid spacing in this instance. Near a frequency $f_0$ of resonance of the gas, corresponding to the fields existing at points B, Fig. 5, the gas exhibits the phenomena of anomalous dispersion, as shown in Fig. 6, where the equivalent index of refraction $n$, near the frequency $f_0$, is plotted against frequency, and the anomalous dispersion region is in the neighborhood $a$, $b$, $c$, of the curve. Hence at points such as B in the moving wave (Fig. 5) the radiation reflected by the molecules at these respective points is each in-phase with the incident radiation at these points; at other points as A and C, the Stark effect causes a phase shift, advancing or retarding.

The wavelength $\lambda_m$ has been selected to be suitably related to the microwave wavelength of radiation from the molecules, and constructive reflection occurs. The required relationship is that:

(1) $$n\lambda = 2\lambda_m \cos \theta$$

where $n$ is any positive integer and $\theta$ is the angle of incidence between the directions of propagation of the incident microwave energy and the direction of travel of the field modulation wave, or the equal angle of reflection between the latter and the direction of propagation of the reflected wave. This relation is analogous to that governing the reflection of X rays from a periodic structure—e. g., a crystal—in which case it is known as the "Bragg condition." Hereinafter the terms "Bragg condition" or "Bragg relation" will be used to refer to (1). For the apparatus here shown, we may take $\theta$ as zero. Then for the simplest case of $n=1$, we have:

(2) $$\lambda = 4s$$

(3) $$s = \lambda/4$$

Next it will be seen that those molecules travelling with the modulation wave at the modulation wave velocity $v_m$ are the principal causes of the response. First, consider molecules moving at other velocities well removed from the specified modulation velocity $v_m$. Their resonances are shifted by the moving modulation wave Stark effect causing them to radiate in different phases over a single period of the moving wave. Looking at the resultant from a large number of these, the radiations tend to be in random phases and not reinforcing. Second, consider molecules moving exactly at the velocity $v_m$, and located at points such as B of Fig. 5. This corresponds to point $b$ of Fig. 6 also, so that such molecules return in-phase radiation, the spacing due to the Bragg condition of $\lambda/4$ between these points insuring a constructive reflection. Consider next paired molecules at points such as A and C at the wave crests on opposite sides of the point B, and also moving with the wave. At these points, the radiation from the molecules is advanced in phase for one and retarded in phase for the other point, due to the Stark effect, so that the resultant (referred to the point B between them) is in-phase with the contributions from points B. Similarly for points such as D and E, $\lambda/4 = s$ apart. Because of the similar motion of these molecules in the X direction, this phase relationship is sustained.

Thus far, however, little consideration has been given to the frequency required for the incident frequency to precisely resonate the molecules contributing to the reflections. As the molecules are retreating from the apparent source of the incident energy, the incident energy must be at a higher frequency by the Doppler shift. It is not difficult to show, to a first order approximation, that the incident radiation must be $$f_0 + \tfrac{1}{2} f_m$$

to resonate the selected molecules moving away from the source at the velocity $v_m$, where $f_0$ is the natural resonance frequency of the molecule (under the influence of the static or fixed field alone). The reflected radiation undergoes another like Doppler shift as viewed at the reception point due to the molecular motion. Therefore the reflected or re-radiated radiation exhibits a resonance line at $f_0 - \tfrac{1}{2} f_m$ which herein is termed the reflection resonant line.

Similarly, it may be shown that when energy is incident at the frequency $f_0 - f_m/2$, a reflection resonance is exhibited at the frequency $f_0 + f_m/2$.

The nature of the reflection resonance line is illustrated in Fig. 7, where $f_0$ is the frequency of natural resonance of the molecule, $f_g$ is the frequency of the incident energy, and the reflection resonance line is at $f_0 - f_m/2$. This resonance reflection line itself exhibits the phenomenon of anomalous dispersion. It is clear that another reflection resonance line appears at frequency $f_0 + f_m/2$. (Not illustrated.) Other lines may be secured in a similar manner, corresponding to a given gas resonance frequency when condition (1) is satisfied.

The reflection line width may be made very small. It may be shown that the spread in the Doppler shifts of the molecules contributing to the constructive reflections is comparable in magnitude to the collision width of the line. The collision width, however may be reduced by reduction of the gas pressure. When the mean free path of the molecules exceeds the wall spacing, collisions with the vessel or envelope walls and with the grids and supporting grid structures are the only factors contributing to collision broadening, which, therefore may be greatly reduced. The method of the invention effectively suppresses contributions to the reflection line from any molecules except those moving with a component of velocity in the direction of motion of the forced space-time wave substantially equal to this forced wave $v_m$ (or otherwise satisfying the Equation 1). In brief, a velocity selection is employed which substantially eliminates wide variations in the velocities of molecules contributing to the reflections. Only a small velocity class of molecules is permitted to contribute. This selection substantially minimizes the Doppler width.

It will be understood that the wave velocity $v_m$ and its equivalent in other embodiments herein, must not be too high. Otherwise, there are so few molecules moving at the selected velocity that the reflections therefrom cannot be detected. It is apparent that the selected wave velocity must be substantially less than the velocity of light in free space. It is also apparent that the wave velocity is preferably in the range of the more probable molecular velocities. Wave velocities corresponding to 5 to 100 kc. s. and the grid spacing employed in the cell 10 have been found suitable.

Line widths of as low as 7 to 10 kc. s. (kilocycles per second) have been obtained with the 3—3 line of ammonia and using the method of the invention here described. One successful gas cell employs 33 grids spaced .314 centimeter apart, center-to-center. Each grid frame is about 9 by 10 centimeters in aperture. The grid frames were constructed of conducting material and themselves served to confine and guide the microwave radiation.

Adjacent frames were separated by .038 cm. insulating washers, and the gaps thus formed in the walls of the cell were dimensioned to form ¾λ chokes (λ=wavelength of the microwave radiation employed) to reduce the leakage of microwave energy. The vacuum envelope is about 16.5 cm. in the X direction and about 23 cm. in diameter normal thereto. Pressure used is about $10^{-4}$ mm. of Hg, and ammonia gas ($NH_3$). Various field strengths were used; as an illustrative example, in one successful trial the D. C. field was approximately 10 volts/cm. and the alternating field about 5 volts/cm. (R. M. S.).

System operation

Returning to Fig. 1, energy from the generator 12 passes through directional coupler 22, waveguide 24, horn 26, and a dielectric plate 62 which hermetically seals cell 10. This incident energy results in molecular reflections as described. The molecular reflected energy passes through plate 62, into horn 26, and waveguide 24. Some passes through directional coupler 22, but most passes into branch 24a and divides in magic Tee 28, half passing into branch 38, the other half being absorbed in absorptive termination 32. Energy from local oscillator 36 also divides at the magic Tee 28, half being absorbed in termination 32 and half passing into branch 38.

Assume the original incident energy to be at a frequency $f_0+f_m/2$. Then the reflected energy includes a part of frequency $f_0-f_m/2$ at the reflection line frequency. This signal may then be treated as a carrier $(f_0+f_m/2)$ and a single lower sideband $(f_0-f_m/2)$. Unavoidable reflections from elements of the cell 10 tend to give rise to an excessively high level of the carrier frequency $f_0+f_m/2$ at the detector crystal 40, thus degrading the performance of the receiver. This reflected energy is in part canceled out by introducing reflections of the appropriate phase and amplitude by a mis-match element (for example a probe to cause reflections) in the output branch of waveguide 22 at the point indicated.

The local oscillator is assumed to give a beat frequency of 30 mc. s. (megacycles per second) with $f_0+f_m/2$. Then the signal output on the connection 44 (which may be, for example, a coaxial line) is a 30 mc. s. signal and a 30 mc. s. minus $f_m$ signal. This corresponds to a carrier of 30 mc. s. and a single lower side band of 30 mc. s. minus $f_m$. An ordinary detector in the 30 mc. s. amplifier and detector 42 may be employed to detect the signal of frequency $f_m$. A frequency discriminator 35 may be employed to assure stability of the 30 mc. s. local oscillator within reasonable tolerances.

Because of the anomalous dispersion effect of the gas cell reflected energy, the phase of the energy of frequency $f_m$ detected is dependent upon how close the energy incident on the gas cell actually is in frequency to $f_0-f_m/2$. Therefore, the detector 46 is preferably designed as a phase detector having an output with sensing, and with the signal from the field modulation oscillator 48 as a reference signal. The output of the detector 46 may be, for example, of positive polarity for phases departing in one sense, and of opposite polarity for phases departing in the other sense, from a specified phase relationship.

The output from the detector 46 may then be employed to control the frequency of generator 12 in known manner. With the sense of the control appropriately selected, the generator 12 may be caused to stay centered on the selected $f_0+f_m/2$ frequency.

It may be noted that the ultimate stability of control depends on the stability of the modulation oscillator frequency $f_m$. However, even large changes in this frequency $f_m$ do not seriously adversely affect the stability, since the percentage change of the frequency $f_0+f_m/2$ is ordinarily exceedingly small. Thus, typically, $f_m$ may have a selected value between 10 and 100 kc. s., whereas the frequency $f_0$ is about 24,000 mc. s. The percentage change in $f_0$ even for relatively large fluctuations in $f_m$, is negligible.

It may be noted that the system of Fig. 1 may be operated in a manner to give velocity selection for arbitrarily low velocities. If the velocities approach zero, however, the field modulation frequency voltages are not afforded a low impedance path through the capacitors 56. Therefore, suitable direct current connections must be made. In the final limit, where $f_m=0$, a D. C. voltage source may be substituted for the field modulation oscillator 48, and the phase detector may be omitted.

Auxiliary frequency stabilizer

As described thus far, the operation of the system is complete. However, it is desirable that the generator 12 be stabilized for rapid fluctuations of frequency. High amplification can be introduced between detector 46 and the generator 12 to amplify and increase the control voltage response, which may help avoid rapid fluctuations. The reason, however, that the control response is not sufficiently effective for practical purposes to stabilize rapid responses is that the reflection line, being weak, requires an amplifier having a very narrow band pass in order to suppress random noise. Such an amplifier has a long "ringing" time and hence the response shifts only slowly with shift in frequency of the incident radiation.

To overcome the rapid fluctuations, the auxiliary stabilization system 20 is provided, which is insufficient in controlling effect to overcome the control by voltage from detector 46, but is much more rapid in response, and thus the voltage is stabilized by the principal system against slow drifts, and by the auxiliary system for more rapid drifts.

The auxiliary system 20 is in itself known. See the article by R. V. Pound, Review of Scientific Instruments, vol. 17; pages 490 to 505 (1946). For the sake of completeness, the auxiliary system 20 is only briefly described herein.

From the directional coupler 16 some energy from generator 12 goes to a magic Tee 65, and divides, one half to a mixer crystal 67 terminating a magic Tee branch 68, and the other half to a reference cavity resonator 70 terminating a magic Tee branch 72. Resonator 70 is resonant near the frequency $f_0+f_m/2$. Energy returned from resonator 72 divides between the other branches 74 and 76 of magic Tee 65. A modulator crystal 78 amplitude modulates the frequency thus applied to branch 76 and returns modulated energy to be divided between branches 68 and 72.

Then the important energy flow in branch or arm 68 is that from the generator 12 and a smaller amplitude modulated portion from the modulator crystal 78. Crystal 78 may be actuated in known manner by a modulating signal from a source 80 of modulating signal, here indicated solely by way of example as a 30 mc./s. oscillator. The signal from the mixer crystal is then taken into a phase detector supplied with a reference signal from the oscillator 80. The output of the detector is also applied as a control voltage to generator 12.

When the generator 12 signal tries to fluctuate, a phase displacement results at resonator 70 which causes the phase of the modulated signal applied to arm 68 to change with respect to the signal from generator 12. This phase change also causes a change in the phase of the detected 30 mc./s. signal at detector 82 with respect to the phase of the original 30 mc./s. signal from oscillator 80. The phase detector then returns a signal to shift the frequency of generator 12 in a direction to reduce the phase shift.

Other gas cell structures

Various gas cells in accordance with the invention can be constructed to give the field periodic both in space and time.

For example, the grids 50 and 52 of Fig. 3 can be modified so that they are connected as shown in Fig. 8. The parallel grid wires are connected to the field modulation oscillator 48 in such a way that the current runs in one direction along the grid wires 50 while running in a reverse direction along the grid wires 52. Accordingly, magnetic fields are set up between the grids which are periodic in space and which are periodic in time with the periodicity corresponding to the frequency $f_m$. The effect may be made higher where the Zeeman effect is quadratic by superimposing a static or fixed magnetic field. For example by means indicated by the magnetic pole pieces N, S (or by a winding) which will increase the shift due to the superimposed alternating magnetic field.

In this case, the same type of frequency selectivity of the molecules contributing to the resonant reflection may be secured and in the same manner.

Referring to Fig. 9 an alternative structure is shown in which opposed pairs of electrodes 90 and opposed pairs 92 alternate along the length of the tube in the direction of the wave of incident energy. Each pair of electrodes 90 is instantaneously of opposite polarity from the other one of the same pair under the influence of a field modulation oscillator 48. At the same time or moment the alternate pairs of electrodes 92 are of instantaneous polarity opposite to each other but in a reverse sense from the polarity of the adjacent pairs of electrodes 90. The resultant electric field as indicated by the vectors E through which the incident energy is to be directed, for example from left to right as viewed in Fig. 9 is periodic in space and also periodic in time, the vectors reversing direction with each alternation of the field modulation oscillator 48. The electrodes 90 and 92 may have square ends facing each its opposite pair or rounded ends as shown in order to avoid as far as possible fringing effects which might reduce the effectiveness of the alternating electric field. A sinusoidal variation in space is desirable. As before, a uniform D. C. field may be superimposed on the periodic field for the reasons discussed above.

Fig. 10 shows still another modification in which pairs of pole pieces 92 alternate with pairs of pole pieces 94 in the direction of travel of incident energy which is to be directed between the pairs. The pole pieces 92, 94 may have faces 92a and 94a which may be elongated in the direction normal to the cross-section view of Fig. 10. The pole pieces are wound and connected to the field modulation oscillator 48 so that each pair is at the same instant of the same magnetic sense adjacent pairs being of the opposite sense. Accordingly, the fields will alternate longitudinally to give a field periodic in space and periodic in time due to the modulation of the field modulation oscillator 48, whereby the magnetic polarity of all the pole pieces is periodically reversed. It is apparent that by reversing the connections of only one each of all the pairs of windings, that the field may be made to have largely components transverse to the direction of radiation and may be made periodic in this sense also. The space periodicity, however, is always periodic in the direction of travel of the incident energy, even if the fields are transverse thereto in direction. If desired, the Zeeman effect may be heightened in the embodiment illustrated in Fig. 10 by superimposing a field by means such as a coaxial coil 96 energized by suitable D. C. current means (not shown).

The operation of the gas cell with the modification illustrated in Figs. 8, 9, or 10 will be apparent from what has been said heretofore. It may be added that in certain cases the polarization of the incident energy may have to be suitably oriented with respect to the vectors of the periodic field in order to give the desired periodic Zeeman or Stark effect and velocity selection as will be understood by those skilled in the art.

Still another gas cell that may be used is the cell 100 of Fig. 10a. Here the field modulation oscillator 48 has its output applied to one end of a coil 102. The coil 102 must have dimensions such as the pitch, size of wire, and diameter and with loading (e. g. capacitively as shown) selected to provide a wave velocity along the axial coil direction comparable to more probable ranges of molecular velocities. At the other end of coil 102 the coil is terminated by an absorptive termination matched to prevent reflections, and schematically indicated by a resistor 104. The gas cell 100 operates on the same principles as those heretofore explained. However, the wave travels in only one direction along the cell. Therefore, only that class of electrons moving in the direction of the wave with the wave velocity may selectively return the sideband reflection line. Other arrangements are known for producing a travelling electromagnetic wave of a sufficiently slow wave velocity that appreciable numbers of molecules are found moving with the wave velocity, and hence these other arrangements may also be employed.

Molecular beam

At sufficiently low gas pressure the width of the reflection line is proportional to the rate of collisions of the molecules with the walls of the cell and with the grid wires. Since the X component of velocity of the molecules may be selected as small as desired, the rate of collisions with the end walls of the cell may be made negligible. Under these conditions the broadening due to wall collisions may be eliminated by restricting the motion of the molecules to directions nearly parallel to the X axis. This may be achieved by utilizing a molecular beam, produced for example by the means illustrated in Fig. 11. A conduit 111 may be inserted preceding the cell 10 through which conduit $NH_3$ gas is admitted to a long waveguide 113 before the gas enters a gas cell 10. The seal 62 may be displaced as shown in Fig. 11, so that the conduit 100 may be inserted in the horn 26. The walls of the waveguide 113 may be immersed in liquid air 115 (the container for which is not shown), and outlet 106 is provided leading to a vacuum pump. The outlet is at the end of gas cell 10 remote from the source of incident microwave energy.

Cooling of the walls of the waveguide 113 tends to restrict the moving molecules to the central section of the waveguide 113. The pump is arranged to work against the incoming gas at such a rate as to maintain the desired degree of vacuum. Accordingly, a rough molecular beam is thereby induced to pass through the gas cell 10 directed with the incident energy, it being assumed that the velocity selection process is in the general direction of motion of the beam. Similar arrangements are obviously possible to induce a rough molecular beam in any desired direction, either with the wave advancing toward or away from the direction of the incident energy.

Alternative systems

An alternative system is illustrated in Fig. 12. A generator 12 supplies energy to a magic Tee 122, this energy dividing in two waveguide arms 124 and 126 of the magic Tee 122. The fourth arm 128 of magic Tee 122 has an absorptive termination. An adjustable absorbing element 130 is provided in arm 126. Arm 126 is also connected at the end remote from magic Tee 122 as the arm of a second magic Tee 132 at which energy from arm 126 divides into the two branch arms 134 and 136, the latter having a matched absorptive termination 138. The second magic Tee arm 134 is terminated in a crystal modulator arrangement 140, the modulating signal being supplied by a 30 mc./s. oscillator 142. The modulated energy is returned through arm 134 and divides into arms 126 and 144, the latter being the fourth arm of the second magic Tee 132. The adjustable absorber 130 assures against too great an amount of energy returning to the generator 12.

Arm 144 of second magic Tee 132 leads to a cavity resonator 146 which acts as a filter to remove one side band and carrier allowing passage of only one side band. At a directional coupler 147, the sideband energy is applied through a waveguide 148 leading from the cavity resonator filter 146 to a waveguide 150 in a direction toward the cell 10. The gas cell 10 may have an absorptive termination 152 to reduce reflections. The gas cell 10 is connected to receive signals from a field modulation oscillator 48, for example as in Fig. 1. The sideband energy is above or below the desired reflection band by the frequency $f_m$. For example, suppose the frequency of generator 12 be taken as $f_g$. Then if the upper sideband $f_g+30$ mc. s.$=f_0\pm f_m/2$, is incident on gas cell 10, the reflection line will be at $f_0\mp f_m/2$. It is intended to stabilize the generator 12 frequency, to be specific say at $f_g=f_0-f_m/2-30$ mc. s. The reflection line frequency employed then is at $f_0+f_m/2$. The gas cell 10 and its termination 152 tend to remove or absorb other frequencies. Of course, the other sideband of frequency $f_g-30$ mc. s. or the other reflection line at $f_0-f_m/2$ could be similarly employed.

Waveguide 148 is terminated at its end on the side of directional coupler 147 remote from the resonator filter 146 by an adjustable mismatch 154, which may comprise a screw or bolt the insertion of an end of which into the waveguide may be adjusted thereby to adjust the mismatch. This mismatch allows a desired amount of carrier energy at $f_g+30$ mc. s. to be reflected with the proper phase so that after traversing directional coupler 148 into guide 150 it will cancel the energy at the same frequency which is reflected by accidental mismatches in the gas cell 10. This procedure is made desirable by the very low ratio of the sideband power reflected from the gas at the frequency $f_g+30$ mc. s.$+f_m/2$ to the carrier power incident on the cell at $f_g+30$ mc. s. In the absences of this cancellation a small mismatch in the cell gives rise to a large ratio of carrier power to sideband power at the mixer crystals 160 and 162, and leads to excessive noise in the receiver. Therefore, mainly energy at the reflection line frequency $f_0+f_m/2$, is directed through waveguide 150 toward a balanced receiver arrangement 156. The absorbent termination 152 aids in reducing other reflections.

The balanced receiver 156 comprises a magic Tee 158 one arm of which leads to waveguide 150 and one arm to waveguide 124. These are one pair of decoupled arms of the magic Tee. The other pair of decoupled arms 161 and 163 of the balanced receiver magic Tee 158 are terminated in crystal detectors 160 and 162. Thus the energy from waveguide 150 at frequency $f_0+f_m/2$, the reflection line frequency, is beat against energy from the generator 12 from waveguide 124 at frequency $f_g=f_0-f_m/2-30$ mc. s. as the reference frequency. The 30 mc. s. amplifier 164, part of the balanced receiver, is tuned as nearly as possible to 30 mc. s.$+f_m$ to accept the 30 mc. s.$+f_m$ signal, which may be treated as a single sideband signal.

The 30 mc. s. carrier signal is beat in a pair of mixer detectors 166 and 168 with a 30 mc. s. reference signal. However, the reference signal applied to both mixer detectors 166 and 168 from the 30 mc. s. oscillator 142 is phase-shifted by $\pm 90°$ before application to one of them, as by a phase shifter 170. As a definite example, suppose the phase shift to be $+90°$.

The outputs of the two mixers 166 and 168 at frequency $f_m$ are added together and applied to amplifier and phase detector 172, one output, however, say that of mixed detector 168 being first phase shifted by $+90°$ in an $f_m$ phase shifter 174. The system comprising the mixers 166 and 168, the phase shifters 170, 174, and the oscillator 142 forms a single sideband detector as is known. Other forms are known; this one is described purely for illustrative purposes. The preferred method for operating this cell, as discussed above, yields two possible responses in reflection, one appearing on the sideband $f_0-f_m/2$ when $f_g=f_0+f_m/2-30$ mc. s., and the other appearing on the sideband $f_0+f_m/2$ when $f_g=f_0-f_m/2-30$ mc. s. This double response might possibly lead to uncertainty in the stabilization point of the oscillator. The operation of the single sideband detector is to suppress one of these responses and eliminate this uncertainty. In particular, in the example described above, the sideband $f_0-f_m/2$ is discarded in the single sideband detector arrangement. Therefore, the only response effective to control the generator 12 is that which stabilizes the generator 12 at $f_g=f_0-f_m/2-30$ mc. s. and gives rise to the sideband $f_0+f_m/2$ at the single sideband receiver arrangement input. The output of the phase detector and amplifier 172 is applied as a control voltage to the generator 12, applied in a sense to return the generator 12 to the frequency $f_g=f_0-f_m/2-30$ mc. s. if it departs therefrom. The operation of the circuit may be briefly reviewed as follows: If the generator departs from the stabilized frequency then the frequency of signal applied to gas cell 10 changes slightly from $f_0-f_m/2=f_g+30$ mc. s. As a result, the reflected energy from gas cell 10 is above or below the reflection line frequency $f_0+f_m/2$, and is subject to a phase shift because of the anomalous dispersion characteristic exhibited by the reflecting molecules. This phase shift is retained in the 30 mc. s.$+f_m$ signal detected in the balanced receiver. The phase shift is also retained in the mixer and detector circuits 166 and 168, and finally detected in the phase detector and amplifier 172. The signal from phase detector and amplifier 172 therefore has sensing and returns the generator 12 to such a frequency that the energy reflected from gas cell 10 is at the reflection line frequency $f_0+f_m/2$.

Fig. 13 illustrates another stabilizing system employing stabilization with a gas cell such as the cell 10. The generator 12 is shown supplying energy through a waveguide 106 to a high Q cavity resonator 108. The resonator 108 supplies energy to a waveguide 110 from which by directional couplers 112 and 114 respectively, energy is applied to an auxiliary stabilizer 116 and an ordinary ammonia gas stabilizer 118. The auxiliary stabilizer 116 may be of the type of auxiliary stabilizer 20 of Fig. 1. The NH3 stabilizer 118 may be of the kind in the Hershberger patent mentioned herein before. Finally, energy from waveguide 110 is applied to a molecular velocity selection stabilizer 120 similar to that of Fig. 1. However, all of these stabilizers of Fig. 13 feed control voltages to the generator 12. The characteristics of the feed-back loop in each instance are selected and designed so that auxiliary stabilizer 116 stabilizes against very fast departures from a fixed frequency, the NH3 stabilizer 118 against slower drifts or departures, and the molecular velocity selection stabilizer 120 against the very slow drifts or departures from the selected frequency of generation. The cavity resonator 108 exercises a preliminary stabilizing effect of rather broad band.

Referring to Fig. 14, another system is disclosed in which a crystal oscillator 200 has a nominal frequency of 238.70 kc. s. (kilocycles per second); the output from the crystal oscillator 200 is multiplied by a frequency multiplier 202 by 100,000 times to provide an output with a nominal frequency of 23,870.11 mc. s. $\pm f_m/2$. This frequency corresponds to one of the NH3 resonances, which is chosen for definiteness in this example. The energy of this frequency is applied to gas cell 10 and the energy reflected therefrom at the reflection line frequency is returned through a waveguide 24a by means of a directional coupler 22; it may be the same as the waveguide and directional coupler shown in Fig. 1. The reflection line energy is then beat down to a 30 mc. s. intermediate frequency signal and in a 30 mc. s. amplifier detector 42 the signal of frequency $f_m$ is detected. The output of the amplifier detector 42 is applied to a phase detector 46 the reference signal being from a field modulation oscillator 48. The resultant output of the phase detector is a control signal which may be used to stabilize the crystal oscillator 200 with great precision at a frequency $1/100,000$ of the nominal line frequency $\pm f_m/2$. This system again is operative because of the anomalous dispersion of the velocity-selected gas causing an apparent phase shift to the energy in the neighborhood of the reflection line freqency. The frequency discriminator 35 supplies a control signal for the local oscillator 36, and serves to maintain the intermediate frequency near the desired value of 30 mc. s.

Referring to Fig. 15, there is illustrated a system for measuring an unknown frequency which, however, is known to be in the vicinity of 24,000 mc. s. The unknown source 204 provides signal through a waveguide 206 to a modulating arrangement 208. The arrangement 208 may be similar to or the same as the arrangement of the crystal modulator in Fig. 12 except that the modulating frequency energy is supplied by a beat frequency oscillator b. f. o. 210. Accordingly, modulated energy including energy at a frequency of the source +130 mc. s. is transmitted to a gas cell 10 by waveguide 144. A directional coupler 211 leads energy reflected from the gas cell 10 to a receiver and detector 212 which in turn supplies energy to an indicator 214. The field modulation oscillator 48 is connected to gas cell 10 as hereinbefore described. The b. f. o. (beat frequency oscillator) 210 is variable and is adjusted until the amplitude of the signal on the indicator 214 is maximum. At this point the frequency of the incoming source plus the frequency of the b. f. o. 210 must be above or below the reflection line frequency by the frequency $f_m$. Whether the frequency is above or below may be determined for example by searching for the other reflection line by causing the incident energy to be above. If the b. f. o. is of a sufficient high frequency, for example 130 mc. s. or of that order, then the lower side beat may be separated or prevented from passing the gas cell 10 by suitable filter 216 inserted in the waveguide 134.

*Conclusion*

It will be apparent that many of the arrangements disclosed are suitable for use in microwave spectroscopy when appropriately modified, to provide spectroscopy systems of extremely high resolution. To this end, it is necessary only to introduce the unknown gas into the gas cell of the invention. The feed-back loop, if any, may be broken at the control voltage point. The generator may be tuned until the reflection line responses are noted on a suitable meter, and the generator frequency noted if calibrated. If not, the generator may be zero beat against a standard.

It will be apparent from the foregoing that there is disclosed herein a novel gas cell and a novel mode of operation and employment of molecular resonance phenomena. It will be understood that the reflection line frequency secured by the operation of the cell and the method of the invention is a very narrow line compared to those secured by gas cell operation in the prior art. Broadening due to the Doppler defect and due to collision effects are substantially reduced. The invention discloses a method of employing velocity selection whereby only that class of molecules moving at a selected predetermined velocity may contribute to constructive reflections or re-radiations.

What is claimed is:

1. A gas cell comprising, an envelope having a longitudinal axis, a molecularly resonant gas at low pressure within said envelope, a plurality of electrodes within said cell spaced successively along said axis and separated a distance $$\frac{n\lambda}{4}$$

where $n$ is an integer and $\lambda$ is the wavelength of microwave energy applied to said cell, and connection means to each of said electrodes for connecting an external source to said electrodes to establish a field within said cell which is periodic both in space and in time.

2. The cell claimed in claim 1, further comprising means to introduce high frequency electromagnetic wave energy to said cell incident in one direction parallel to said axis and through the field of said wave.

3. The gas cell claimed in claim 1, said means comprising several magnetic pole pieces spaced periodically in the direction along said axis.

4. The combination comprising a gas cell having an envelope, a gas contained in said envelope at a low pressure and exhibiting molecular resonance, and means to provide an electric field wave of frequency $f_m$ in said cell moving through said gas at a wave velocity $v_m$ substantially less than the velocity of light in free space, means to introduce microwave energy at a frequency corresponding to a free-space wavelength $\lambda$ into said gas to be propagated through said moving wave field, means to utilize microwave energy re-radiated from said gas, the wavelength of said moving wave $\lambda_m = v_m/f_m$ being related to the said free-space wavelength $\lambda$ substantially by the Bragg condition: $n\lambda = 2\lambda_m \cos \theta$, where $\theta$ is the angle between the direction of propagation of the incident microwave energy and the direction of travel of the said moving wave, whereby only a selected class of molecules moving with a predetermined velocity contribute constructively to the re-radiated microwave energy.

5. The combination comprising a gas cell having an envelope, a gas contained in said envelope at a low pressure and exhibiting molecular resonance, and means to provide a magnetic field wave of frequency $f_m$ in said cell moving through said gas at a wave velocity $v_m$ substantially less than the velocity of light in free-space, means to introduce microwave energy at a frequency corresponding to a free-space wavelength $\lambda$ into said gas to be propagated through said moving wave field, means to utilize microwave energy re-radiated from said gas, the wavelength of said moving wave $\lambda_m = v_m/f_m$ being related to the said free-space wavelength $\lambda$ substantially by the Bragg condition: $n\lambda = 2\lambda_m \cos \theta$, where $\theta$ is the angle between the direction of propagation of the incident microwave energy and the direction of travel of the said moving wave, whereby only a selected class of molecules moving with a predetermined velocity contribute constructively to the re-radiated microwave energy.

6. The combination claimed in claim 4, further comprising means to provide a static electric field on which said electric field wave is superimposed.

7. The combination claimed in claim 5, further comprising means to provide a fixed magnetic field on which said magnetic field wave is superimposed.

8. The combination claimed in claim 4, said means to provide an electric field wave comprising at least several planar grids having aligned grid openings each with parallel wires across said opening, said wires being normal to the electric vector of the said microwave energy, said grids being equally spaced apart each from the next adjacent one in the direction normal to their planes.

9. The combination claimed in claim 4, said means to provide an electric field wave comprising several pairs of electrodes each spaced from its paired electrode in a direction transverse to said electric field wave direction of motion and each pair spaced from the next adjacent pair in the direction along which said electric field wave moves.

10. The combination claimed in claim 5, said means to provide a magnetic field wave comprising several pairs of pole pieces each spaced from its paired electrode in a direction transverse to said magnetic field wave direction of motion and each pair spaced equally from the next adjacent pair in the said direction of motion.

11. The combination claimed in claim 4, said means to provide an electric field wave comprising several pairs of electrodes, each spaced from its paired electrode in a direction transverse to the electric field wave direction of motion, and each pair spaced equally from the next adjacent pair in the said direction of motion, each pair being connected to have opposite electric polarities.

12. The combination claimed in claim 4, said means to provide an electric field wave comprising several pairs of electrodes, each spaced from its paired electrode in a direction transverse to the electric field wave direction of motion, and each pair spaced equally from the next adjacent pair in the said direction of motion, each said pair being connected to have like electric poles opposite in sense from those of the adjacent pair.

13. The combination claimed in claim 5, said means to provide a magnetic field wave comprising several spaced grids, each having grid wires disposed substantially in a plane, said planes being parallel to each other and normal to the said magnetic field wave motion, said grids being equally spaced apart in said direction of motion, the wires of each grid being connected to carry currents in the same direction opposite to the direction of current carried by the next adjacent grid.

14. A frequency stabilization system comprising a microwave generator the frequency of generation of which is to be stabilized, a gas cell, a gas within said cell at a low pressure exhibiting microwave resonance at a frequency $f_0$, means comprising an oscillator to establish in said gas a wave moving at a wave velocity $v_m$ and said oscillator having oscillations of a frequency $f_m$, means to direct incident microwave energy derived from said generator into said cell, and a receiver connected to receive microwave energy re-radiated by the gas molecules, the wavelength of the said field wave and the wavelength of said microwave energy being related by the generalized Bragg condition thereby providing a velocity selection of constructively re-radiating molecules, the frequency of said incident microwave energy being that required to resonate the gas molecules moving at the said wave velocity, said receiver comprising means to employ said re-radiated energy which exhibits a reflection line and energy from said generator respectively as a single side-band and carrier energy and thereby to detect a difference frequency wave between carrier and side-band as a modulating frequency, and a phase detector connected to receive from said oscillator a reference frequency wave and to receive the detected difference frequency wave and having as output a control voltage dependent on the said detected difference frequency wave phase with said reference frequency wave, said output being connected to stabilize the frequency of said microwave generator.

15. The system claimed in claim 14, and at least one auxiliary stabilization system having a stabilizing effect on the frequency of said generator.

16. A frequency stabilization system comprising a microwave generator the frequency of generation of which is to be stabilized, a gas cell, a gas within said cell at a low pressure exhibiting microwave resonance at a frequency $f_0$, means comprising a first oscillator to establish in said gas a wave moving at a velocity $v_m$ and said oscillator having oscillations of a frequency $f_m$, means to select a single sideband of said modulated energy and to direct said single sideband energy as incident microwave energy into said cell, and a receiver connected to receive microwave energy re-radiated by the gas molecules in said cell, the wavelength of said field wave and the wavelength of said selected single sideband microwave energy being related by the generalized Bragg condition, thereby providing a velocity selection of constructively re-radiating molecules, the frequency of said incident microwave energy being that required to resonate the gas molecules moving at the said wave velocity, said receiver comprising means to employ said re-radiated energy which exhibits a reflection line as single sideband energy, means to detect said single sideband energy by supplying carrier frequency energy from said second oscillator and means to detect the resultant detected energy comprising a phase detector connected to said first oscillator to derive therefrom reference frequency energy, the output of said phase detector being connected to said generator to stabilize the frequency of generation.

17. A gas cell comprising, an envelope having a longitudinal axis, a molecularly resonant gas at low pressure within said envelope, a plurality of electrodes within said cell spaced successively along said axis and separated a distance $$\frac{\lambda}{4}$$

where $\lambda$ is the wavelength of microwave energy applied to said cell, and connection means to each of said electrodes for connecting an external source to said electrodes to establish a field within said cell which is periodic both in space and in time.

18. A gas cell comprising an envelope having a longitudinal axis, a molecularly resonant gas at low pressure within said envelope, a plurality of electrodes within said cell spaced successively along said axis and separated a distance $$\frac{n\lambda}{4}$$

where $n$ is an integer and $\lambda$ is the wavelength of microwave energy applied to said cell, connection means for connecting each of said electrodes to a source external to said envelope, said source comprising means for producing an alternating-current wave superimposed on a direct-current wave whereby a field is established in said cell which is periodic both in space and in time.

19. A gas cell comprising, an envelope having a longitudinal axis, a molecularly resonant gas at low pressure within said envelope, a plurality of electrodes within said cell spaced successively along said axis and separated a distance $$\frac{n\lambda}{4}$$

where $n$ is an integer and $\lambda$ is the wavelength of microwave energy applied to said cell, and connection means to each of said electrodes for connecting an external source to said electrodes to establish an electric field within said cell which is periodic both in space and in time.

20. A gas cell comprising, an envelope having a longitudinal axis, a molecularly resonant gas at low pressure within said envelope, a plurality of electrodes within said cell spaced successively along said axis and separated a distance $$\frac{n\lambda}{4}$$

where $n$ is an integer and $\lambda$ is the wavelength of microwave energy applied to said cell, and connection means to each of said electrodes for connecting an external source to said electrodes to establish a magnetic field within said cell which is periodic both in space and in time.

21. A gas cell comprising, an envelope having a longitudinal axis, a molecularly resonant gas at low pressure within said envelope, a plurality of plane grid electrodes within said cell spaced successively along said axis and separated a distance $$\frac{n\lambda}{4}$$

where $n$ is an integer and $\lambda$ is the wavelength of microwave energy applied to said cell, said grid electrodes being parallel to each other and normal to the direction of travel of said microwave energy, and connection means to each of said grid electrodes for connecting an external source to said electrodes to establish a field within said cell which is periodic both in space and in time.

References Cited in the file of this patent

UNITED STATES PATENTS

| | | |
|---|---|---|
| 2,486,001 | Bruck et al. | Oct. 25, 1949 |
| 2,524,290 | Hershberger | Oct. 3, 1950 |
| 2,532,157 | Evans | Nov. 28, 1950 |
| 2,555,131 | Hershberger | May 29, 1951 |
| 2,587,055 | Marshall | Feb. 26, 1952 |
| 2,596,251 | Kock | May 13, 1952 |
| 2,653,270 | Kompfner | Sept. 22, 1953 |
| 2,688,106 | Bernier | Aug. 31, 1954 |
| 2,707,231 | Townes | Apr. 26, 1955 |
| 2,707,235 | Townes | Apr. 26, 1955 |